(12) United States Patent
Koop

(10) Patent No.: US 7,353,857 B2
(45) Date of Patent: Apr. 8, 2008

(54) CHAIN STOPPER

(75) Inventor: Lars Koop, Bremerhaven (DE)

(73) Assignee: Hunter Douglas Industries BV, El Rotterdam (NL)

( * ) Notice: Subject to any disclaimer, the term of this patent is extended or adjusted under 35 U.S.C. 154(b) by 130 days.

(21) Appl. No.: 11/297,987

(22) Filed: Dec. 9, 2005

(65) Prior Publication Data

US 2006/0143876 A1    Jul. 6, 2006

(30) Foreign Application Priority Data

Dec. 17, 2004    (EP)    ................... 04078428

(51) Int. Cl.
*E06B 9/322*    (2006.01)
(52) U.S. Cl. ............... 160/178.1 R; 24/116 A; 160/321
(58) Field of Classification Search .......... 24/116 A, 24/116 R, 114.5; 474/154, 203; 59/93; 160/321, 178.1 R, 178.1 V, 178.2, 257, 258, 160/307–309, 319
See application file for complete search history.

(56) References Cited

U.S. PATENT DOCUMENTS

| | | | |
|---|---|---|---|
| 1,522,297 A | * | 1/1925 | Godsol ............... 40/662 |
| 2,577,046 A | | 12/1951 | Svirsky |
| 4,424,852 A | * | 1/1984 | Hopper ............... 160/309 |
| 4,865,109 A | * | 9/1989 | Sherman ............... 160/321 |
| 6,325,132 B1 | | 12/2001 | Anderson et al. |

FOREIGN PATENT DOCUMENTS

| | | |
|---|---|---|
| DE | G 87 00 548.4 U1 | 3/1987 |
| DE | 297 11 893 U | 9/1997 |
| WO | WO 03/033853 A1 | 4/2003 |

* cited by examiner

*Primary Examiner*—James R Brittain
(74) *Attorney, Agent, or Firm*—Dorsey & Whitney LLP

(57) ABSTRACT

A ball chain stopper for inhibiting movement of ball chains used in window blinds and the like for moving the blinds between operative positions is adapted to be attached to intermediate chain members which interconnect adjacent balls of the ball chain. The ball stoppers are characterized as having a maximum cross-sectional size that is equal to or less than the size of the maximum cross-section of the balls of the chain.

15 Claims, 5 Drawing Sheets

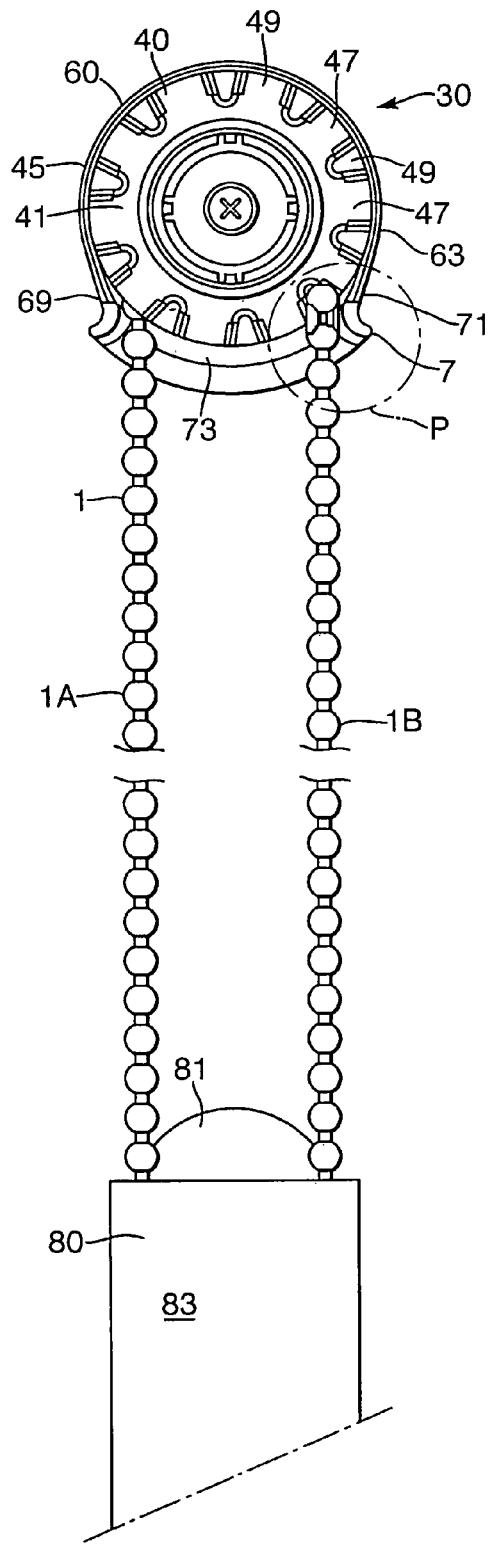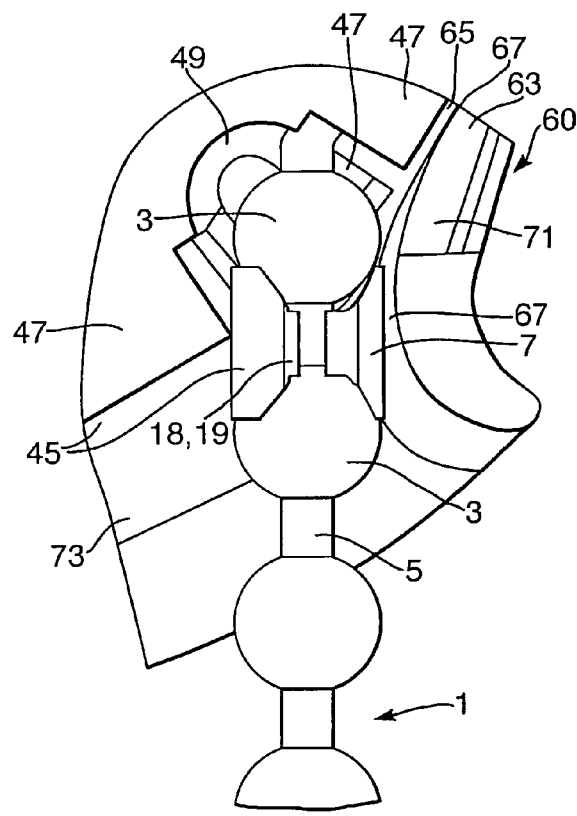

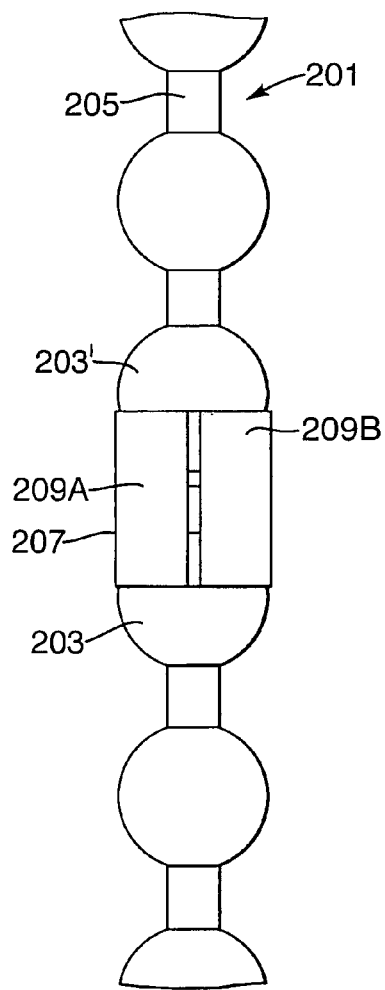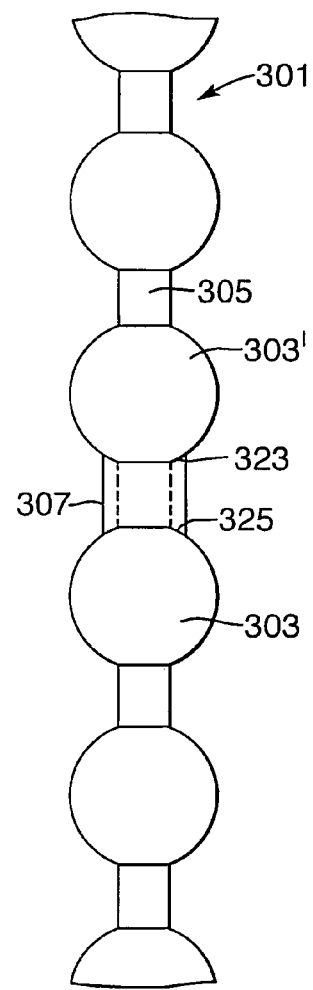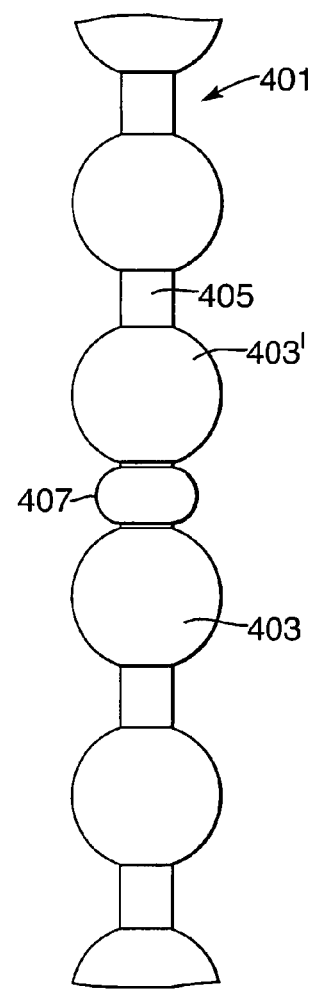

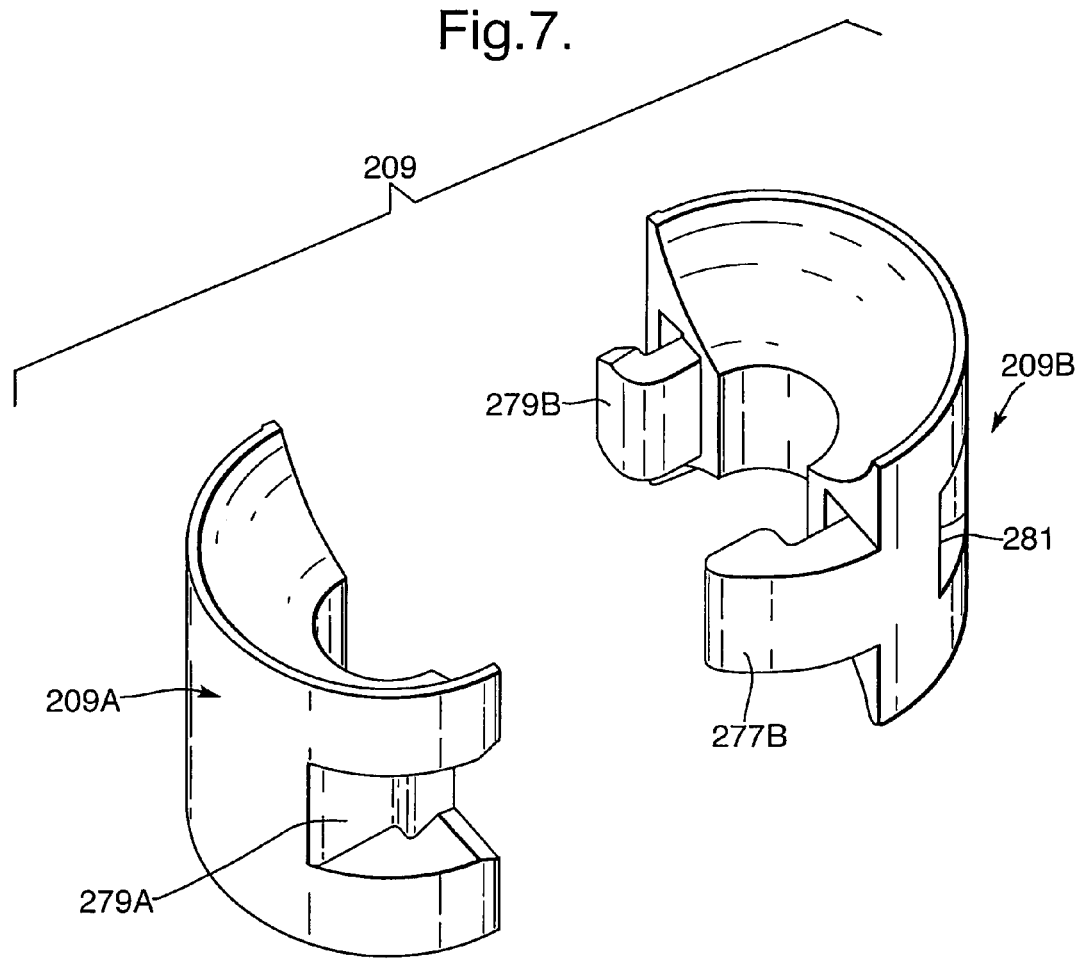

CHAIN STOPPER

CROSS REFERENCE TO RELATED APPLICATION

This application claims priority to European patent application No. 04078428.2, filed 17 Dec. 2004, which is hereby incorporated by reference as if fully disclosed herein.

BACKGROUND OF THE INVENTION

1. Field of the Invention

The invention relates to a chain stopper for a ball chain, particularly for an operating system of a window blind, such as a horizontal or vertical venetian blind, a roller blind or the like.

2. Description of the Related Art

Ball chain operating systems for window blinds are known in the art, for example, in DE 87 00 548, DE 297 11 893. They generally include a sprocket or drive wheel for driving a driven blind member such as a drive shaft, a ball chain operatively engaging the sprocket wheel, a cover on the sprocket wheel and a chain stopper on the ball chain. In these systems, the sprocket wheel is drivingly connected to a driven member of a blind; in DE 87 00 548, the blind is a roller blind, and in DE 297 11 893, the blind is a vertical venetian blind. A sprocket wheel can also drive other blinds, such as a horizontal venetian blind or a roman shade. The driven member can be a conventional drive shaft of a roller blind, a central control shaft of a roman shade, a lift or tilt shaft of a horizontal venetian blind or a traverse or tilt shaft of a vertical venetian blind, or the like.

The ball chain, in such systems, comprises a plurality of spaced apart balls. The ball chain is looped over the sprocket wheel to operatively engage it, so that first and second depending portions of the ball chain are on either side of the sprocket wheel. By pulling one of the depending portions of the ball chain, the sprocket wheel is rotated in either a clockwise or counter-clockwise direction, and the driven shaft also is rotated. This results in a roller blind being rolled up or unrolled, a venetian blind being tilted or lifted or lowered, a vertical venetian blind being traversed or tilted or a roman shade being lifted or lowered.

The sprocket wheel, in such systems, is provided with a cover. The cover generally is over at least the part of the sprocket wheel where the ball chain is looped over it, but open top covers are also known (e.g., U.S. Pat. No. 2,577, 046). The cover is open at the bottom for passage of the opposite depending portions of the ball chain. The cover acts as a guiding means to guide the ball chain into engagement with the sprocket wheel and prevent the ball chain from disengaging from the sprocket wheel.

In such systems, ball chains have been provided with one or more separate members which act as chain stoppers. The stoppers have been adapted to block movement of the ball chains, thus stopping the rotation of the sprocket wheels and operating movement of the blinds. They have also been used to prevent ball chain from being pulled further than necessary for performing desired operating movements of the blinds, for example, for preventing further than a maximum tilt of a venetian blind or preventing a roller blind from being rolled-up too far whereby its bottom bar would bang against its roller or its housing.

The stoppers of DE 87 00 548, DE 297 11 893 grip two adjacent balls of their ball chains and have a cross-section that is bigger than the cross-section of the balls. These stoppers thus block the ball chains at the bottom of their covers and prevent the ball chains from being further pulled over their sprocket wheels. Such stoppers also connect the separate ends of the ball chains by gripping over and connecting together the last ball of each ball chain end.

A drawback of these stoppers is that they are very visible and rather ugly.

Also, their size prevents them from sliding through cord weights, such as are generally used on vertical blinds. Such a cord weight is described, for example, in U.S. Pat. No. 6,325,132, and comprises a pulley rotatably mounted within a weighted outer shell.

SUMMARY OF THE INVENTION

In accordance with this invention, a chain stopper is provided for attachment to a ball chain having a plurality of balls which are spaced apart along the length of the chain and are interconnected by a plurality of intermediate chain members that extend along the length of the chain between adjacent balls; the stopper being adapted to be attached to the chain between two adjacent balls, about an intermediate chain member between the two adjacent balls, and being characterized by a maximum cross-sectional size that is equal to or less than the size of the maximum cross-section of the balls of the chain. This stopper is less visible and can slide through a cord weight along with the ball chain, to which it is attached.

Advantageously, the stopper has a length, along the length of the chain, that is equal to or less than the distance between the maximum cross-sections of any two adjacent balls along the length of the chain. Also advantageously, the stopper has a top and a bottom, an outer surface and a hollow interior extending between the top and bottom. It is especially advantageous that the stopper is generally cylindrical. It is also especially advantageous that the hollow interior of the stopper has a general hour-glass shape, with a top bowl-like socket, a bottom bowl-like socket and a bore or passage connecting the two sockets. It is also especially advantageous that the stopper has a slot that extends between its top and bottom and extends from its outer surface to its hollow interior. Also advantageously, the stopper comprises two parts.

Also in accordance with this invention, a ball chain is provided having a plurality of balls which are spaced apart along the length of the chain and are interconnected by a plurality of intermediate chain members that extend along the length of the chain between adjacent balls; and the chain being characterized by a chain stopper of this invention, attached to the chain about an intermediate chain member between two adjacent balls.

Further in accordance with this invention, a blind operating system is provided comprising: a sprocket wheel for driving a driven blind member; a ball chain looped over the sprocket wheel and operatively engaging it; and a cover over at least a portion of the sprocket wheel that is in contact with the ball chain; the chain having a plurality of balls which are spaced apart along the length of the chain and are interconnected by a plurality of intermediate chain members that extend along the length of the chain between adjacent balls; and the system being characterized by at least one chain stopper of this invention, attached to the chain about an intermediate chain member between two adjacent balls.

BRIEF DESCRIPTION OF THE DRAWINGS

Further aspects of the invention will be apparent from the detailed description and drawings, in which:

FIG. 3 is a perspective view of an operating system for a roller blind, including a sprocket wheel, a ball chain, and the stopper of FIGS. 1 and 2, cooperating with the sprocket wheel in a so-called 'stop-position';

FIG. 4 is a detail view of FIG. 3, showing the stopper of FIGS. 1-3 cooperating with the sprocket wheel in the 'stop-position';

FIGS. 6A-6C are perspective views of third, fourth and fifth embodiments of the stopper of the invention on ball chains; and FIG. 7 is a perspective view of the two-part stopper of FIG. 6A.

DETAILED DESCRIPTION OF THE PREFERRED EMBODIMENTS

Figure 1:
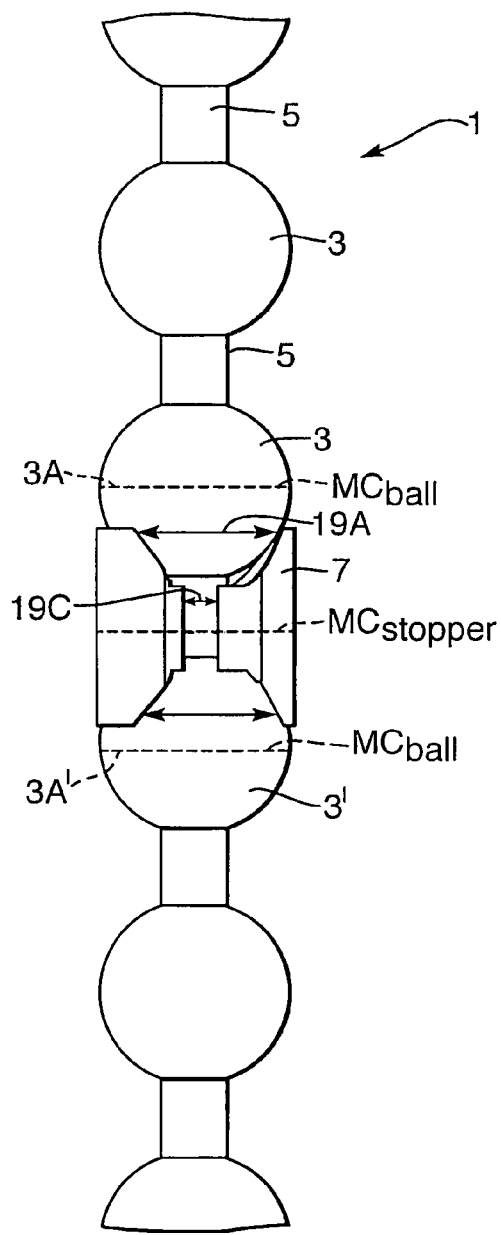
FIG. 1 is a perspective view of a first embodiment of a chain stopper of the invention on a portion of a ball chain.

FIG. 1 shows a portion of the length of a conventional ball chain 1 with a plurality of balls 3 that are spaced apart along the length of the chain 1. Connecting each pair of adjacent balls 3 and extending between them, along the length of the chain 1, is an intermediate chain member 5. Preferably, the intermediate chain members 5 are all of equal length along the length of the chain 1. The distance between two adjacent balls 3 along the length of the chain 1 is a function of the length of the intermediate chain member 5 between them.

Each ball 3 is preferably spherical as shown in FIGS. 1-6 but can have another shapes as described below. The maximum cross-section of each ball 3, perpendicular to the length of the ball chain 1, is indicated as "$MC_{ball}$" in the Figures. The location of this maximum cross-section $MC_{ball}$ on a spherical ball 3 coincides with the meridian 3A of the ball. For other non-spherical balls 3, their maximum cross-section $MC_{ball}$ will be described in relation to their meridians as explained below.

As shown in FIG. 1, a first embodiment of a chain stopper 7 of this invention is provided on the ball chain 1, between a pair of adjacent balls 3, 3' and about the intermediate chain member 5, between them. The stopper 7 has a length, parallel to the length of the chain 1, that is indicated as "$L_{stopper}$" and is preferably equal to or less than the distance, along the length of the chain 1, between the maximum cross-section $MC_{ball}$ at the meridians 3A, 3A' of its adjacent balls 3, 3'. The maximum cross-section of the stopper 7, perpendicular to the length of the chain 1, is indicated as "$MC_{stopper}$" in the Figures. Preferably, $MC_{stopper}$ of the stopper 7 is equal to or less than $MC_{ball}$ of the balls 3 of the chain 1.

Figure 2:
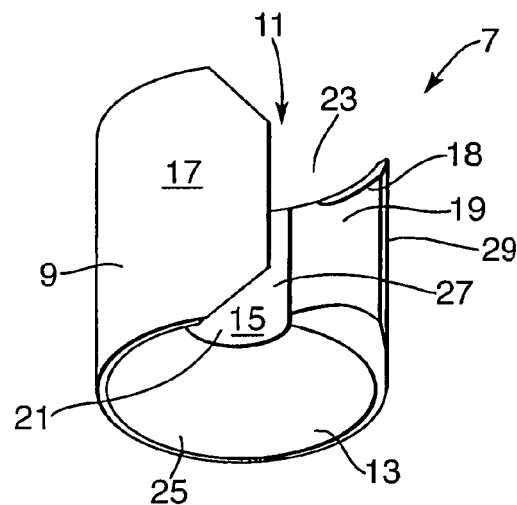
FIG. 2 is a perspective view of the stopper of FIG. 1.

FIG. 2 shows the stopper 7 as comprising a generally hollow cylindrical body 9 with a top 11, a bottom 13, an inner surface 15, an outer surface 17 and a slot 19 that extends lengthwise between the stopper's top and bottom 11, 13 and also extends from the stopper's outer surface 17 to its inner surface 15 and its hollow interior 21. The hollow interior 21 is of an hour-glass like shape having a upper bowl-like socket portion 23 at the top 11 of the stopper, a lower bowl-like socket portion 25 at the bottom 13 of the stopper and a connecting passage or bore 27 between the two socket portions 23, 25. The top bowl-like socket portion 23 is suitably shaped to accommodate a portion of the upper adjacent ball 3 in a ball-socket jointed type connection, and likewise, the bottom bowl-like socket portion 25 is suitably shaped to accommodate a portion of the lower adjacent ball 3'. The bore 27 within the stopper's hollow interior 21 extends parallel to the length of the chain and can accommodate the intermediate chain member 5 between the adjacent balls 3, 3' when the stopper is attached to the chain 1.

Because the slot 19 of the stopper 7 connects its outer surface 17 with its hollow interior 21, the slot 19 allows the stopper to be removably assembled to the ball chain 1 between any pair of adjacent balls 3, 3'. The slot 19 can be slid over an intermediate chain member 5, so that the stopper 7 surrounds the intermediate chain member which then lies in its hollow interior 21. The slot 19 also allows for slight movement of the adjacent balls 3,3' relative to the sockets 23, 25.

As shown in FIG. 2, the slot 19 of the stopper 7 preferably has a wedge shape larger at the opening 18 in the stopper's outer surface 17 and much narrower at its inner surface 15 about its hollow interior 21. This shape facilitates the attachment of the stopper 7 to the chain 1. Also instead of simple straight edges in the stopper's outer surface 17, about the opening 18 in the lengthwise slot 19, such edges 29 preferably form an hour-glass like contour in the stopper's outer surface 17, about the slot 19. The hour-glass contour of slot 19 has a top width 19A, an intermediate width 19B and a bottom width 19C. The top width 19A is sufficient for passage of the upper adjacent ball 3 onto the upper socket 23 of the stopper body, and the bottom width 19C is likewise sufficient for passage of the lower adjacent ball 3' onto the lower socket 25 of the stopper body. The intermediate width 19B is for passage of the intermediate chain member 5 into the bore 27 of the stopper's hollow interior 21.

FIG. 3 shows an operating system 30 for a roller blind (not shown) with the ball chain 1 and the stopper 7 of FIGS. 1 and 2. The system 30 is shown from a front side, on which the system will be attached to the blind's drive shaft (also not shown).

As shown in FIG. 3, the operating system 30 has a conventional drive or sprocket wheel 40 that is at least partially covered by a conventional cover or housing 60. The chain 1 is looped over, and thereby operatively connected to, the sprocket wheel 40. A left or first depending chain portion 1A and a right or second depending chain portion 1B of the chain 1 are on opposite sides of the sprocket wheel 40. A portion of an optional cord weight or tensioner 80 is shown, suspended from the chain portions 1A, 1B.

As also shown in FIG. 3, the sprocket wheel 40 has a front web 41 and a rear web 43 (not shown) and an circumferential outer surface 45 between the front and rear webs. On the outer circumferential surface of the sprocket wheel 40, the front and rear webs 41, 43 each have a plurality of radially-extending sprocket teeth 47 that alternate with pockets 49 suitable for accommodating the balls 3 of the chain 1.

As further shown in FIGS. 3 and 4, at the rear of the cover 60 is a base 61, rotatably connected to, and supporting, the rear side of the sprocket wheel (not visible). A flange 63 extends axially and frontwardly from the base 61. The flange 63 is dimensioned and shaped to cover at least a radial portion of the circumferential surface of the sprocket wheel 40. A gap 65 between an inner surface 67 of the flange 63 and the outer surface 45 of the sprocket wheel 40 is sufficiently wide to allow the sprocket wheel, with the ball chain 1 looped over it, to rotate within the cover 60 but is sufficiently narrow to prevent the chain 1 from disengaging from the sprocket wheel. The flange 63 does not cover the lower radial portion of the outer surface 45 of the sprocket wheel 40, thus allowing the balls 3 to sequentially engage separate pockets 49 of the sprocket wheel as one of the depending chain portions 1A, 1B is pulled and the sprocket wheel is rotated. The cover 60, at the lower radial portion of the outer surface 45 of the sprocket wheel, also includes a lower left flange portion 69 and a lower right flange portion 71, and between them extends an open portion or flange free portion 73 of the base 61. The open portion 73 can be a unitary or single portion wide enough for both depending chain portions 1A, 1B, or it can include an intermediate flange portion (not shown), creating separate, left and right channels, one for each depending chain portion.

The base 61 of the cover 60 also preferably includes means (not shown) for attaching the cover to a conventional mounting bracket for the blind that is to be attached to the system 30.

As still further shown in FIG. 3, the cord weight 80 includes a rotatable pulley 81 and a weighted or tensioned shell 83. The stopper 7 can pass through the pulley 81 unhindered, because the pulley is not a sprocket wheel. Preferably, the ball-socket connection 23, 25 between the stopper 7 and the adjacent balls 3, 3' adds flexibility to the ball chain 1, allowing the stopper to pass even more easily with the chain through the cord weight 80 and around its pulley 81.

In use, pulling one of the depending portions 1A, 1B of the ball chain 1, looped about the sprocket wheel 40, causes the sprocket wheel to move with the chain and to rotate counter-clockwise or clockwise as shown in FIG. 3. The roller of the blind (not shown) will rotate together with the sprocket wheel, and the blind will be rolled about the roller or unrolled from the roller, depending upon its direction of rotation.

The chain stopper 7 is shown in FIGS. 3 and 4 in a left stop position P. In this stop position, even if the left depending chain portion 1A is pulled downwardly, the sprocket wheel 40 will not rotate. From this position, the sprocket wheel can only be rotated in an opposite direction by pulling downwardly the right depending chain portion 1B. In the left stop position P, the stopper 7 is caught between a tooth 47 of the sprocket wheel 40 and an inner surface 67 of the lower right flange portion 71 of the cover 60.

FIGS. 5 to 7 show alternative embodiments 107, 207, 307 and 407 of the chain stopper of the invention which are similar to the stopper 7 of FIGS. 1-4 and for which corresponding reference numerals (greater by 100, 200, 300 and 400, respectively) are used below for describing the same parts or corresponding parts.

Figure 5A:
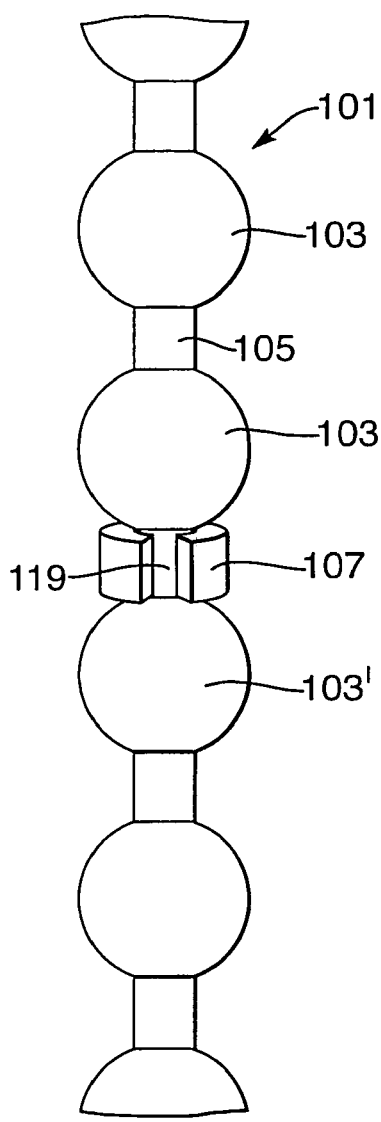
FIG. 5A is a perspective view of a second embodiment of the stopper of the invention on a ball chain.

FIG. 5A shows a second embodiment 107 of the chain stopper assembled to a ball chain 101.

Figure 5B:
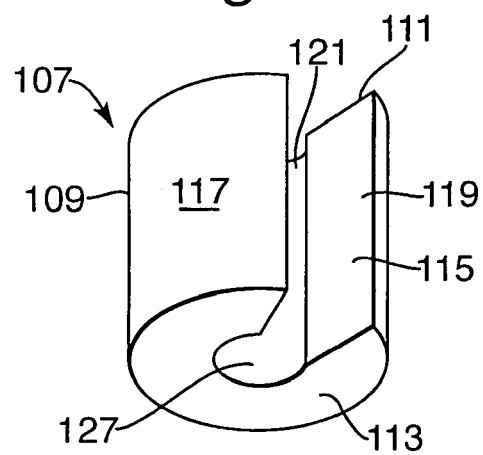
FIG. 5B is a perspective view of the stopper of FIG. 5A.

FIG. 5B shows that the stopper 107 has a hollow cylindrical body 109 with a top 111, a bottom 113, an inner surface 115, an outer surface 117 and a slot 119 that extends lengthwise between its top 111 and bottom 113 and which also extends from its outer surface 117 to its inner surface 115 and its hollow interior 121. The hollow interior 121 has a general cylindrical bore 127 for accommodating an intermediate portion 105 of the ball chain 101, between two of its adjacent balls 103, 103'.

The stopper 107 has a slot 119 which allows the stopper 107 to be removably assembled to the chain 101 between any pair of adjacent balls 103, 103' and about intermediate chain member 105. The slot 119 is preferably shaped like a wedge that is wider at the outer surface of 117 of the stopper than at its inner surface 115, about its hollow interior 121, so as to allow for easy attachment of the stopper to the chain.

The length of the stopper between its top 111 and bottom 113 is equal or less then the length of the intermediate chain member 105 between two adjacent balls 103, 103'.

FIG. 6A shows a third embodiment 207 of the chain stopper having a hollow cylindrical body 209 with a top 211, a bottom 213, an inner surface 215, an outer surface 217 and a hollow interior 221. The two-part stopper 207 has a left body half 209A and a right body half 209B, enclosing an intermediate portion 205 between two adjacent balls 203, 203' of a ball chain 201. The body halves 209A, 209B can have a flexible joint between them at one side, shaping the stopper into a book-like member. No slot extending lengthwise between the stopper's top and bottom 211, 213 and from its outer surface 217 to its inner surface 215 is necessary. The two halves 209A, 209B of the stopper 207 can be closed about the intermediate chain member 205 in any conventional manner, for example with an adhesive. The stopper halves 209A, 209B can also be made so that they can be reopened as described below with regard to FIG. 7.

FIG. 6B shows a fourth embodiment 307 of the chain stopper, having a hollow cylindrical body 309 with a top 311, a bottom 313, an inner surface 315, an outer surface 317 and a hollow interior 321. The stopper 307 has top and bottom sockets 323, 325 which are very shallow, Thereby, the lengthwise slot (not shown), between the stopper's top and bottom 311, 313 and from its outer surface 317 to its inner surface 315, can have the shape of the slot 119 of the stopper 107 of FIGS. 5A and 5B.

FIG. 6C shows a fifth embodiment 407 of the chain stopper, having a hollow cylindrical body 409 with a top 411, a bottom 413, an inner surface 415, an outer surface 417 and a hollow interior 421. The stopper 407 is shaped like a ball. Indeed, the stopper 407 could be an additional ball between two adjacent balls 403, 403' of the ball chain 401, provided the intermediate chain member 405 is long enough to accommodate such an extra ball.

FIG. 7 shows details of the two-part stopper 207 of FIG. 6A. The left and right body halves 209A, 209B have a snap-locking mechanism 275 for releasable opening of the stopper. The snap-lock mechanism includes a left snap-lug 277A (not shown) on the left body half 209A, and a complementary right snap-lug retainer 279B on the right body half 209B. Similarly, there is a right snap-lug 277B on the right body half 209B, and a complementary left snap-lug retainer 279A on the left body half 209A. When the two body halves are placed about an intermediate chain member 205, the halves can be snapped shut and are then in operative engagement. The ball chain 201 and stopper 207 are ready for use.

To release of the snap-lock mechanism 275, a tool (like a screw-driver or a pen) can be inserted in the opening between the body halves 209A, 209B to push the snap-retainers 279A, 279B and the snap-lugs 277A, 277B out of operative engagement.

This invention is, of course, not limited to the above-described embodiments which may be modified without departing from the scope of the invention or sacrificing all of its advantages. In this regard, the terms in the foregoing description and the following claims, such as "left", "right", "clockwise", "counter-clockwise", "front" and "rear", have been used only as relative terms to describe the relationships of the various elements of the chain stopper of the invention for a ball chain for an operating system of a window blind. For example, the chain stoppers 7, 107, 207, 307 and 407 could be used for venetian blinds or pleated blinds, not just roller blinds.

Likewise, the ball chains 1, 101, etc. could be shaped by balls formed on a chain or cord, in which case the intermediate chain members 5, 105, etc. would be portions of the chain or cord material. Alternatively the ball chains could be shaped by balls and the intermediate chain members that are assembled to form the ball chain. Preferably, the ball chains includes a cord and plastic balls that are formed on the cord, but the balls could also be crimped on a braided cord or the ball chains could be integrally formed by injection molding.

Similarly, non-spherical balls, such as balls of oblong cross-sections, could be used, I ball chains of this invention. For example, conical, tetrahedonical or cylindrical balls as shown in WO 03/033853 (FIGS. 5-8) could be used. However, the size and spacing of such balls in ball chains will have to be appropriate for the type and size of the sprocket wheels, with which such ball chains are to be used.

For any non-spherical ball that has, along its length, a constant maximum cross-section $MC_{ball}$, it can be assumed that its meridian is at the middle of its length. This can be the case for balls of oblong, rectangular or square cross-sections. Any non-spherical ball that has its maximum cross-section $MC_{ball}$ at a certain point along its length, that point can be assumed to be the meridian. This can be the case for conical, pyramidical or tetrahedonical shaped balls. Such uncommon non-spherical balls can be made into ball chains of this invention and suitable sprocket wheels can be made to co-operate with such ball chains. The chain stopper of the invention will be suitable for ball chains comprising such non-round ball members.

As described above, the chain stoppers 7, 107, etc. have cross-sections that are no bigger than the cross-sections of the balls 3, 103, etc. of the ball chains 1, 101, etc., with which the stoppers are to be used. However, so that the stoppers 7, 107, etc. function correctly, their cross-section ($MC_{stopper}$) also has to be at least somewhat bigger than the distance between the teeth 47 of the sprocket wheel 40 and the inner surface 67 of a lower flange portion 71 of the cover 60. This distance is usually designed to let the intermediate chain members 5, 105, etc. closely pass without problem, but it can be larger. This means that depending on the type of sprocket wheel 40 that is used, the thinnest possible chain stopper 7, 107, etc. can have a cross-section that is just slightly thicker than the cross-section of the intermediate chain members 5, 105, etc. of the ball chains 1, 101, etc.

I claim:

1. A blind operating system comprising in combination: a sprocket wheel for driving a driven blind member; a ball chain looped over the sprocket wheel and operatively engaging it; and a cover that is over at least a portion of the sprocket wheel and that is in contact with the ball chain; the chain having a plurality of balls which are spaced apart along the length of the chain and are interconnected by a plurality of intermediate chain members that extend along the length of the chain between adjacent balls; the system being characterized by at least one chain stopper, attached to the chain about an intermediate chain member between two adjacent balls, the chain stopper having a maximum cross-sectional size ($MC_{stopper}$) that is equal to or less than the size of the maximum cross-section of the balls ($MC_{ball}$) of the chain.

2. The combination of claim 1 wherein said stopper has a length (Lstopper), along the length of the chain, that is equal to or less than the distance between the maximum cross-sections (MCball) of any two adjacent balls along the length of the chain.

3. The combination of claim 2 wherein the stopper comprises two parts.

4. The combination of claim 2 wherein said stopper has a top, a bottom, an outer surface and a hollow interior, extending between the top and bottom.

5. The combination of claim 4 wherein the stopper comprises two parts.

6. The combination of claim 4 wherein said hollow interior is a cylindrical bore.

7. The combination of claim 6 wherein the stopper comprises two parts.

8. The combination of claim 6 wherein said stopper has a slot that extends between its top and bottom and extends from its outer surface to its hollow interior.

9. The combination of claim 8 wherein said slot is wedge shaped and is larger at the stopper's outer surface and much narrower at its hollow interior.

10. The combination of claim 1 wherein the stopper comprises two parts.

11. A chain stopper for attachment to a ball chain having a plurality of balls which are spaced apart along the length of the chain and are interconnected by a plurality of intermediate chain members that extend along the length of the chain between adjacent balls; the stopper being adapted to be attached to the chain between two adjacent balls, about an intermediate chain member between the two adjacent balls, and being characterized by a maximum cross-sectional size ($MC_{stopper}$) that is equal to or less than the size of the maximum cross-section of the balls ($MC_{ball}$) of the chain, said stopper having a length ($L_{stopper}$), along the length of the chain, that is equal to or less than the distance between the maximum cross-sections ($MC_{ball}$) of any two adjacent balls along the length of the chain, and having a top, bottom, and outer surface and a hollow interior extending between the top and the bottom with the hollow interior being a cylindrical bore and further including a slot that extends between its top and bottom and extends from its outer surface to its hollow interior, said slot being wedged shaped and larger at the stopper's outer surface and much narrower at its hollow interior.

12. A chain stopper for attachment to a ball chain having a plurality of balls which are spaced apart along the length of the chain and are interconnected by a plurality of intermediate chain members that extend along the length of the chain between adjacent balls; the stopper being adapted to be attached to the chain between two adjacent balls, about an intermediate chain member between the two adjacent balls, and being characterized by a maximum cross-sectional size ($MC_{stopper}$) that is equal to or less than the size of the maximum cross-section of the balls ($MC_{ball}$) of the chain, the stopper having a length ($L_{stopper}$), along the length of the chain, that is equal to or less than the distance between the maximum cross-sections ($MC_{ball}$) of any two adjacent balls along the length of the chain and having a top, a bottom, an outer surface, and a hollow interior extending between the top and bottom with the hollow interior having a generally hour-glass shape, with a top bowl-like socket, a bottom bowl-like socket, and a bore connecting the two sockets.

13. The chain stopper of claim 12 wherein said stopper has a slot that extends between its top and bottom and extends from its outer surface to its hollow interior.

14. The chain stopper of claim 13 wherein said slot is wedge shaped and is larger at the stopper's outer surface and much narrower at its hollow interior.

15. The chain stopper of claim 12 wherein the stopper comprises two parts.

* * * * *